(12) United States Patent
Alexander et al.

(10) Patent No.: US 9,594,566 B1
(45) Date of Patent: *Mar. 14, 2017

(54) ACCURACY OF OPERAND STORE COMPARE PREDICTION USING CONFIDENCE COUNTER

(71) Applicant: INTERNATIONAL BUSINESS MACHINES CORPORATION, Armonk, NY (US)

(72) Inventors: Khary J. Alexander, Poughkeepsie, NY (US); Jane H. Bartik, Poughkeepsie, NY (US); Jatin Bhartia, Ghaziabad (IN); James J. Bonanno, Wappingers Falls, NY (US); Adam B. Collura, Hopewell Junction, NY (US); Jang-Soo Lee, Poughkeepsie, NY (US); James R. Mitchell, Poughkeepsie, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,478

(22) Filed: Aug. 26, 2016

Related U.S. Application Data

(63) Continuation of application No. 15/090,909, filed on Apr. 5, 2016, which is a continuation of application No. 14/886,465, filed on Oct. 19, 2015.

(51) Int. Cl.
*G06F 9/30* (2006.01)
*G06F 9/38* (2006.01)

(52) U.S. Cl.
CPC ........ *G06F 9/3861* (2013.01); *G06F 9/30021* (2013.01); *G06F 9/30043* (2013.01);
(Continued)

(58) Field of Classification Search
CPC ............................ G06F 9/3806; G06F 9/3834
See application file for complete search history.

(56) References Cited

U.S. PATENT DOCUMENTS

| | | | | |
|---|---|---|---|---|
| 5,099,416 A | * | 3/1992 | Tanaka | G06F 9/3834 365/230.08 |
| 5,465,336 A | * | 11/1995 | Imai | G06F 9/3834 711/167 |

(Continued)

*Primary Examiner* — Corey S Faherty
(74) *Attorney, Agent, or Firm* — Cantor Colburn LLP; Margaret A. McNamara

(57) ABSTRACT

Technical solutions are described for dynamically managing an operand-store-compare (OSC) prediction table for load and store operations executed out-of-order. One general aspect includes a method that includes receiving a request to retire a queue entry corresponding to an instruction. The method also includes identifying an OSC prediction for the instruction based on an OSC prediction table entry, where the OSC prediction indicates if the instruction is predicted to hit an OSC hazard. The method also includes determining if the instruction hit the OSC hazard. The method also includes in response to the OSC prediction indicating that the instruction is predicted to hit the OSC hazard and the instruction not hitting the OSC hazard, invalidating the OSC prediction table entry corresponding to the instruction. The present document further describes examples of other aspects such as methods, computer products.

1 Claim, 11 Drawing Sheets

(52) U.S. Cl.
CPC ........ *G06F 9/30145* (2013.01); *G06F 9/3844* (2013.01); *G06F 9/3855* (2013.01)

(56) References Cited

U.S. PATENT DOCUMENTS 8,468,325 B2    6/2013   Alexander et al.
9,128,725 B2    9/2015   Meier et al.

* cited by examiner

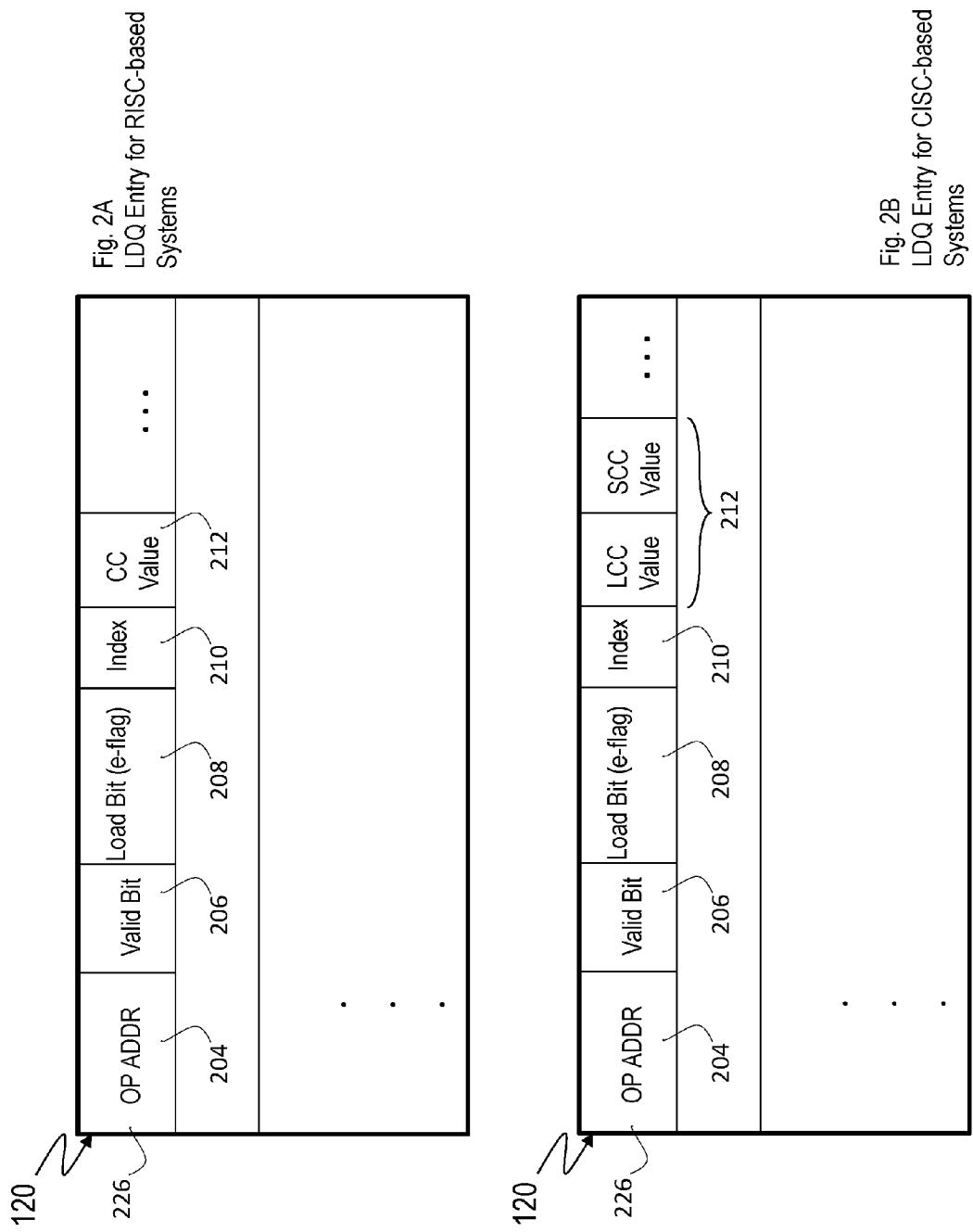

STQ Entry for RISC-based Systems

STQ Entry for CISC-based Systems

OSC Prediction Table for RISC-based Systems

OSC Prediction Table for CISC-based Systems

ACCURACY OF OPERAND STORE COMPARE PREDICTION USING CONFIDENCE COUNTER

PRIORITY

This application is a continuation of and claims priority from U.S. patent application Ser. No. 15/090,909, filed on Apr. 5, 2016, entitled "ACCURACY OF OPERAND STORE COMPARE PREDICTION USING CONFIDENCE COUNTER", which in turn claims priority from U.S. patent application Ser. No. 14/886,465, filed on Oct. 19, 2015 the entire contents of which are incorporated herein by reference.

BACKGROUND

The present invention generally relates to microprocessors, and more particularly relates to managing load and store operations executed out-of-order.

A processor, such as microprocessor that is capable of issuing and executing machine instructions out of order will in general permit loads to be executed ahead of stores. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. For example, the recovery process typically involves invalidating the load instruction that caused the violation and all newer instructions in program order beyond the load instruction, and second reissuing the load instruction. Conventional mechanisms for managing store-compare hazards generally do not manage these hazards very effectively.

SUMMARY

According to an embodiment, a method for dynamically managing an operand-store-compare (OSC) prediction table for load and store operations executed out-of-order includes receiving a request to retire a queue entry corresponding to an instruction. The method also includes identifying an OSC prediction for the instruction based on an OSC prediction table entry, where the OSC prediction indicates if the instruction is predicted to hit an OSC hazard. The method also includes determining if the instruction hit the OSC hazard. The method also includes in response to the OSC prediction indicating that the instruction is predicted to hit the OSC hazard and the instruction not hitting the OSC hazard, invalidating the OSC prediction table entry corresponding to the instruction.

According to another embodiment, a system for dynamically managing an operand-store-compare (OSC) prediction table for load and store operations executed out-of-order, the system includes a memory, and a processor communicatively coupled to the memory. The processor performs a method. The method includes executing an instruction, where the instruction is at least one of a load instruction and a store instruction. The method also includes creating a queue entry corresponding to the instruction. The method also includes receiving a request to retire the queue entry in response to completion of the instruction. The method also includes identifying, based on the OSC table, an OSC prediction for the instruction, where the OSC prediction indicates if the instruction is predicted to hit an OSC hazard. The method also includes determining if the instruction hit the OSC hazard. The method also includes in response to the OSC prediction indicating the instruction predicted to hit the OSC hazard and the instruction not hitting the OSC hazard, invalidating an OSC prediction table entry corresponding to the instruction.

Another embodiment includes a computer product for dynamically managing an operand-store-compare (OSC) prediction table for load and store operations executed out-of-order. The computer product includes a computer readable storage medium that includes computer executable instructions. The computer readable storage medium includes computer executable instructions to create a queue entry corresponding to an instruction, where the instruction is one of a load and a store instruction. The computer readable storage medium includes computer executable instructions to receive a request to retire the queue entry in response to completion of the instruction. The computer readable storage medium includes computer executable instructions to identify, based on the OSC table, an OSC prediction for the instruction, where the OSC prediction indicates if the instruction is predicted to hit an OSC hazard. The computer readable storage medium includes computer executable instructions to determine if the instruction hit the OSC hazard. The computer readable storage medium includes computer executable instructions to in response to the OSC prediction indicating that the instruction is predicted to hit the OSC hazard and the instruction not hitting the OSC hazard, invalidating an OSC prediction table entry corresponding to the instruction.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIGS. 2A and 2B show examples of load queue entries according to one embodiment of the present invention.

DETAILED DESCRIPTION

In microprocessors that execute load and store instructions out-of-order, three operand-store-compare hazards (store-hit-load, non-forwardable load-hit store, and persistent non-forwardable load-hit store) can occur due to reordering between dependent loads and stores. For example, assume that a Store to address A is followed by a Load to address A. In one situation the Load can execute before the Store, that is, the Store Queue (STQ) does not comprise the store address information. Therefore, the store queue does not indicate a conflict when the load executes. Once the Load finishes execution, the Store executes and detects the conflict against the already finished Load in the load queue and flushes the pipeline to stop the Load and any subsequent instruction. This is a very costly operation since a large amount of work needs to be redone (the Load and all future instructions that were already executed speculatively before). The situation above is referred to as a Store-hit-Load (SHL).

In another situation, the Store executes its address calculation, but the data for the Store is delayed, for example, because the data-producing instruction has a long latency (such as a divide instruction). Then the Load executes before the store data is written into the STQ. The Load detects that it is dependent on the Store, but the Load cannot perform store-data-forwarding since the data is not available. Therefore, the Load rejects and retries later, such as after the store data has become available. This situation is referred to as a non-forwardable Load-hit-Store (nf-LHS).

In yet another situation, similar to the nf-LHS situation discussed herein, certain store instructions (for example, if a line-crossing store, or if the length>8 bytes) may not be forwardable in general (per the specific STQ design). In this situation, the Load, even if the store data is already written into the STQ, recycles repeatedly until the Store is written back into the L1 cache. This situation is referred to as a "persistent nf-LHS."

Conventional mechanisms for managing out-of-order processing, in general, do not effectively handle the three hazards discussed above. For example, some conventional mechanisms restrict Instruction-Level-Parallelism (ILP) by making the Load dependent on all prior Store instructions. Other conventional mechanisms generally cannot handle the common case where a Load instruction is dependent on multiple store instructions, where those multiple store instructions may be on different branch paths leading to the Load instruction.

Figure 1:
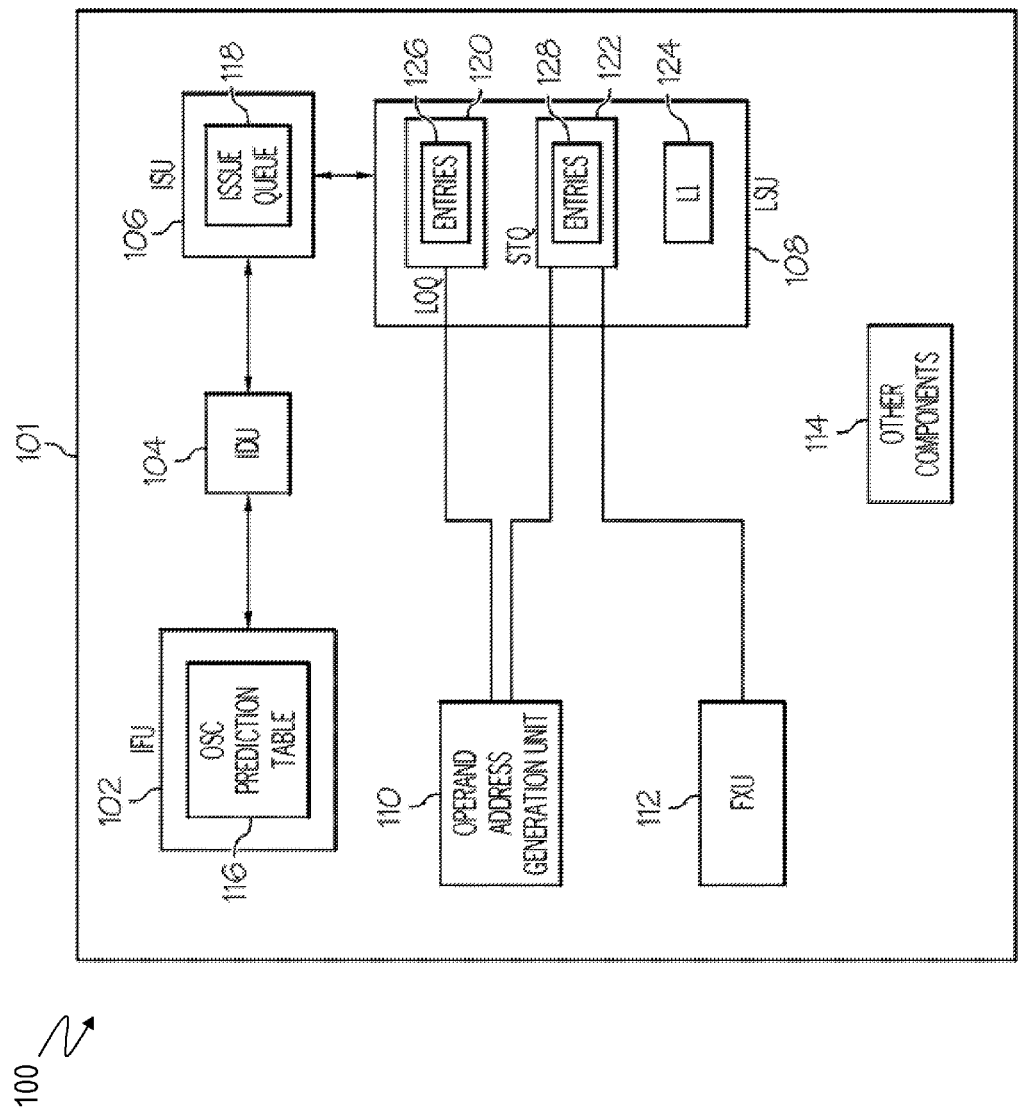
FIG. 1 illustrates one example of an operating environment according to one embodiment of the present invention.

FIG. 1 is a block diagram illustrating one example of an operating environment 100 applicable to one or more processes instructions and data in accordance with one or more embodiments described herein. The processor 101 comprises a single integrated circuit processor such as a superscalar processor, which, includes various execution units, registers, buffers, memories, and other functional units that are all formed by integrated circuitry. The processor 101, in one embodiment, is capable of issuing and executing instructions out-of-order. The processor 101 may be a Reduced Integration Set Computing (RISC) based processor or a Complex Integration Set Computing (CISC) based processor. A CISC based processor facilitates instructions that can be both, a Load and a Store instruction. The RISC based processor facilitates instructions that can be either a Load instruction or a Store instruction. The technical solutions described herein improve OSC prediction regardless of whether the system uses a RISC based or CISC based processor.

The processor 101, in one embodiment, comprises an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, comprises an operand-store-compare (OSC) prediction table 116. The OSC prediction table 116 is discussed in detail below.

The issue unit 106, in this embodiment, comprises an issue queue 118. The LSU 106, in this embodiment, comprises a load queue (LDQ) 120, a store queue (STQ) 122, and an L1 cache 124. The LDQ 120 and the STQ 122 each comprise entries 126, 128, respectively, that track additional information associated with outstanding load and store instructions. It should be noted that various embodiments of the present invention are not limited to the configuration of the processor 101 as shown in FIG. 1. The embodiments of the present invention are applicable to a variety of architectures, which can vary from the example shown in FIG. 1.

In general, the IFU 102 fetches instruction codes stored in an I-cache, which can be part of the L1 cache 124. The IDU 104 decodes the fetched instruction codes into instruction processing data. Once decoded the IDU 104 dispatches and places the instructions temporarily in an appropriate issue queue 118. The instructions are held in the issue queue 118 until all their required operands are available. From the issue queue(s) 118, instructions can be issued opportunistically to the execution units, such as, the LSU 108, the FXU 112, of the processor 101 for execution. In other words, the instructions can be issued out-of-order. The instructions however, are maintained in the issue queue(s) 118 until execution of the instructions is complete, and the result data, if any, are written back, in case any of the instructions needs to be reissued.

During execution within one of the execution units 108, 112 an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

OSC prediction table is used to predict and avoid the OSC hazards in out-of-order microprocessors, such as the three hazards discussed above. The OSC prediction table facilitates predictions of which Loads and Stores have dependencies and the type of these dependencies (such as e-bit or w-bit dependencies). Then after instruction decoding, e-bit Loads are made dependent on all prior e-bit Stores, and are treated by the instruction issue logic as if there was a regular register dependency. This delays execution of the e-bit Load instruction until after all e-bit Stores have executed their address calculation, and written their data into the STQ. This in effect removes SHL and nf-LHS hazards. For w-bit dependencies, the Load is made dependent on the L1 cache writeback of the last store that was predicted as w-bit Store. This effectively prevents persistent nf-LHS hazards.

A technical problem with the OSC prediction table is that incorrect predictions create bad (false) dependencies between store and load and force them to be processed sequentially when they don't need to. The technical solutions described herein reduce bad OSC dependencies by creating dependencies if the OSC predictions were made with strong confidence and by dynamically removing the instructions not causing OSC hazards anymore from the OSC prediction table. The technical solutions, thus, improve accuracy of OSC prediction, which in turn improves performance of the microprocessor because incorrect predictions create bad (false) dependencies between store and load and force them to be processed sequentially when they don't need to. The bad dependencies prevent the load from being issued until all stores that are forced to be dependent on finish their executions, which limits the number of instructions being executed in parallel and thus affects performance adversely. Such a degradation of performance due to bad dependencies can be larger than the benefit obtained from avoiding OSC hazards (pipeline flushes or rejects) with good dependencies.

The bad (or false) OSC dependencies are created when loads and stores are installed into OSC prediction table by OSC events that occur once or only a few times and won't occur again in the future. For example, an OSC hazard can occur when a load is dependent on a store that hit a cache miss. The store and load will be installed into OSC prediction table. Later, when the required cache line is loaded into cache, the same pair of store and load won't experience an OSC hazard anymore. As another example, a store and load can change their memory access addresses independently and thus their memory access addresses are rarely over-wrapped. The stores and load installed into OSC prediction table by rare OSC events will keep predicting the corresponding instructions as likely-victim and likely-perpetrator until being removed out of the OSC prediction table based on the LRU. Incorrect predictions by OSC prediction table create bad dependencies not only between the corresponding store and load but also with other stores and loads with good OSC prediction within the issue queue window. For example, a load marked as a likely-victim gets forced to be dependent on all active stores marked as likely-perpetrators in issue queue even though the load is actually dependent on only one or none of the stores. Further yet, a larger issue/execution window such as one used in modern microprocessor causes more bad dependencies.

As described earlier, the technical solutions described herein reduce the bad OSC dependencies by creating dependencies if the OSC predictions were made with strong confidence and by dynamically removing the instructions not causing OSC hazards anymore from the OSC prediction table. To this end, the technical solutions add a confidence counter (CC) to every OSC prediction table entry. The CC gets incremented or decremented depending on the OSC prediction and resolution. The CC facilitates the ISU to create dependencies only for the instruction that caused the OSC hazards multiple times in the past. Further, the CC facilitates removal of an OSC prediction table entry that has instructions that did not cause OSC hazards multiple times after being installed into OSC prediction table. Thus, the CC increases prediction accuracy by predicting OSC hazards and managing OSC prediction table adaptively and dynamically based on workload behaviors.

In general, a Load is allocated an entry in the LDQ 120, which saves the address of each load after it executed until completion. A Store is allocated an entry in the STQ 122, which similarly saves the store address, from execution of the store address computation until the store completes and has written its data to the L1 cache 124. However, based on the type of hazard detected, an LDQ entry and an STQ entry can also comprise additional information to predict and avoid OSC hazards.

For example, in one embodiment, the LSU 108 executes a load instruction and compares this load to a corresponding entry in the STQ 122. The load instruction determines that store-data-forwarding cannot be performed. For example, the load is executing prior to the store data being written to the STQ (nf-LHS) or store-data-forwarding is not allowed even when the data is available (persistent of-LHS). The load instruction then sets an OSC hazard bit such as an "e-flag" (for example, an execution flag) in the STQ entry it compared against if the load instruction detected an nf-LHS hazard. Alternatively, the load instruction sets an OSC hazard bit such as a "w-flag" (for example, a write flag) in the STQ entry it compared against if the load instruction detected a persistent nf-LHS hazard. The load instruction also sets the same OSC hazard bit such as the e-flag or the w-flag in its own entry in the LDQ 120.

When an executed store instruction detects an SHL hazard and performs an SHL flush against an LDQ entry, the store instruction sets an OSC hazard bit such as the "e-flag" in its own STQ entry, and also sets an OSC hazard bit such as the "e-flag" in the (oldest) LDQ entry the instructions compares against. It should be noted that this LDQ entry is invalidated due to the resulting flush, but the "e-flag" is retained in the LDQ 120. When the processor pipeline starts re-fetching and re-executing the flushed instructions, the same load is allocated the same LDQ entry, which now has the "e-flag" set from before the flush.

FIG. 2 illustrates an example load queue, according to one embodiment. The LDQ 120 is the load queue that holds all Load instructions being executed. The LDQ 120 is looked up by all store instructions being issued to detect store-hit-load OSC hazard. FIG. 2A illustrates an example LDQ entry 226 for a RISC based system while FIG. 2B illustrates an example LDQ entry 226 for a CISC based system. Referring to FIG. 2, in addition to information such as operand address information 204 and valid bit information 206, the LDQ entry 226 in the LDQ queue 120 also includes one or more OSC hazard bits 208. An OSC hazard bit 208 can be an e-flag or a w-flag depending on whether the load instruction encountered an nf-LHS hazard or a persistent nf-LHS hazard. FIG. 2 illustrates an example with a single OSC hazard bit referred to as a Load Bit 208 for facilitating execution dependency. In another example, the LDQ entry 226 may include other dependency bits, such as a w-flag to facilitate predicting write-back dependency. The OSC hazard bit 208 can be set by a store instruction, as discussed above. It should be noted that other types of flags could be used to designate that the load instruction encountered an nf-LHS hazard or a persistent nf-LHS hazard. The load bit 208 of the LDQ entry 226 in an example may be used to indicate that the corresponding load was an OSC-Victim. A Load instruction that causes an OSC hazard as a victim is referred to as an OSC-Victim. The LDQ entry 226 further contains an index 210 that indicates the location in OSC prediction table where prediction information for the Load instruction is read from. The LDQ entry 226 may include additional information that is not illustrated. The LDQ entry 226 in case of a RISC based or a CISC based system includes one or more confidence counter values 212. For example, for a RISC based system the LDQ entry 226 includes a single confidence counter (CC) value 212 corresponding to a CC in the OSC prediction table entry. In a CISC based system the LDQ entry 226 includes a pair of CC values 212, a Load CC value (LCC) and a Store CC value (SCC). The corresponding OSC prediction table entry in the CISC based system includes a corresponding pair of CCs, LCC, and SCC, as described herein. The CC values 212 represents a previous value of the corresponding CC in the OSC prediction table entry.

Figure 3A:
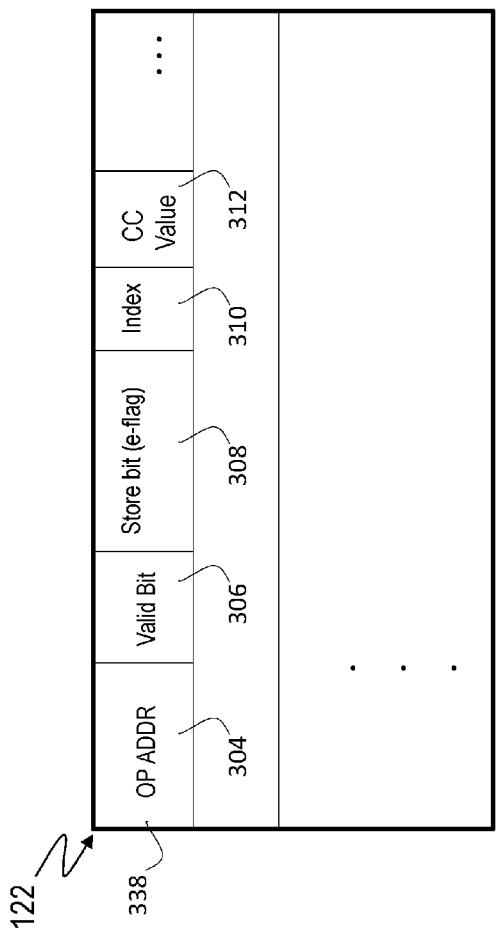
FIGS. 3A and 3B show examples of store queue entries according to one embodiment of the present invention.
Figure 3B:
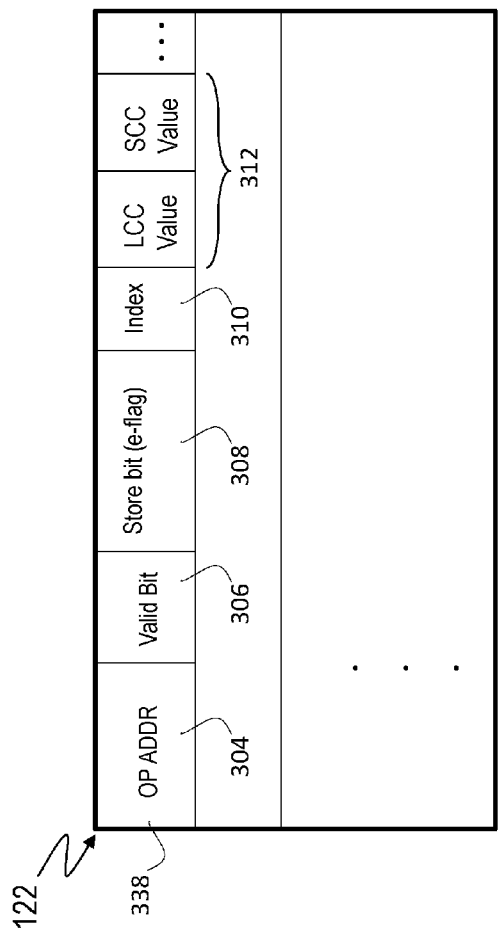

Referring now to FIG. 3, a store queue is illustrated, according to one embodiment. The STQ 122 is the store queue that holds all Store instructions being executed. The STQ holds a STQ entry 338 corresponding to each Store instruction. The STQ 122 is looked up by all load instructions being issued to detect load-hit-store OSC hazards. FIG. 3A illustrates an example STQ entry 338 for a RISC based system while FIG. 3B illustrates an example STQ entry 338 for a CISC based system. Referring to FIG. 3, the STQ entry 338, in addition to information such as operand address information 304 and valid bit information 306, includes one or more OSC hazard bits 308. As discussed above, an OSC hazard bit 308 can be an e-flag or a w-flag depending on whether a load instruction encountered an nf-LHS hazard or a persistent nf-LHS hazard. FIG. 3 illustrates an example with a single OSC hazard bit referred to as a Store Bit 308 for facilitating execution dependency. In another example, the STQ entry 338 may include other dependency bits, such as a w-flag to facilitate predicting write-back dependency. The store-bit 310 of the STQ entry 338 may be set if the store instruction encountered an SHL hazard, as discussed above. The store-bit 308 of the STQ entry 338 may indicate that the corresponding store was an OSC-Perp. A Store instruction that causes an OSC hazard as a perpetrator is referred to as an OSC-Perp. The STQ entry 338 further contains an index/setid 310 that indicates the location in OSC prediction table entry that contains prediction information for the store instruction. The STQ entry 338 may include additional information that is not illustrated. The STQ entry 338 in case of a RISC based or a CISC based system includes one or more confidence counter values 312. For example, for a RISC based system the STQ entry 338 includes a single confidence counter (CC) value 312 corresponding to a CC in the OSC prediction table entry. In a CISC based system the STQ entry 338 includes a pair of CC values 312, a Load CC value (LCC) and a Store CC value (SCC). The corresponding OSC prediction table entry in the CISC based system includes a corresponding pair of CCs, LCC, and SCC, as described herein. The CC values 312 represents a previous value of the corresponding CC in the OSC prediction table entry.

Other types of flags could be used to designate that the load instruction encountered an nf-LHS hazard or a persistent nf-LHS hazard and/or that a store instruction encountered an SHL hazard. The OSC hazard indicating bit 208, 308 in one of the queues 120, 122 matches at least one OSC hazard indicating bit 208, 308 in the other queue 120, 122 since the load or store instruction sets the same bit in an entry of the other queue as it sets in an entry of its own queue. The OSC hazard bit information 208, 308 is used to predict and avoid OSC hazards.

For example, once the load instruction completes, the load instruction determines if it has OSC hazard bit information, such as an e-flag or a w-flag, in the LDQ 120. If so, the load instruction indicates this to the IFU 102. The IFU 102, in one embodiment, then generates an entry in an OSC prediction table 116 for this particular load instruction. The OSC prediction table will create an entry based on the instruction address of the Load and remember the one or more flags for this Load. For example, an entry in OSC prediction table indicates whether a Load is associated with an e-flag and/or a w-flag, where the Load can have both flags if the Load compares against multiple store queues.

When a Store instruction has completed and is written back to the L1 cache 124, the Store instruction determines if it has OSC hazard bit information, such as an e-flag or a w-flag, in the STQ 122. If so, the store instruction indicates this to the IFU 102. The IFU 102 then generates an entry in an OSC prediction table 116, for this particular store instruction comprising the instruction address of the store instruction and the one or more flags under the instruction address of the Store. Also, when the store instruction is written back to the L1 cache 124, the STQ 122 informs the ISU 106 of the STQ-entry-number (stag) of that given store instruction within the STQ 122.

FIG. 4 shows example OSC prediction table entry 402 within the OSC prediction table 116. The OSC prediction table 116 contains entries for stores and loads that caused OSC hazards in the past. The entries in the OSC prediction table are maintained using caching algorithms such as least recently used (LRU). The OSC prediction table 116 is looked up by instruction address and provides OSC prediction information.

Figure 4A:
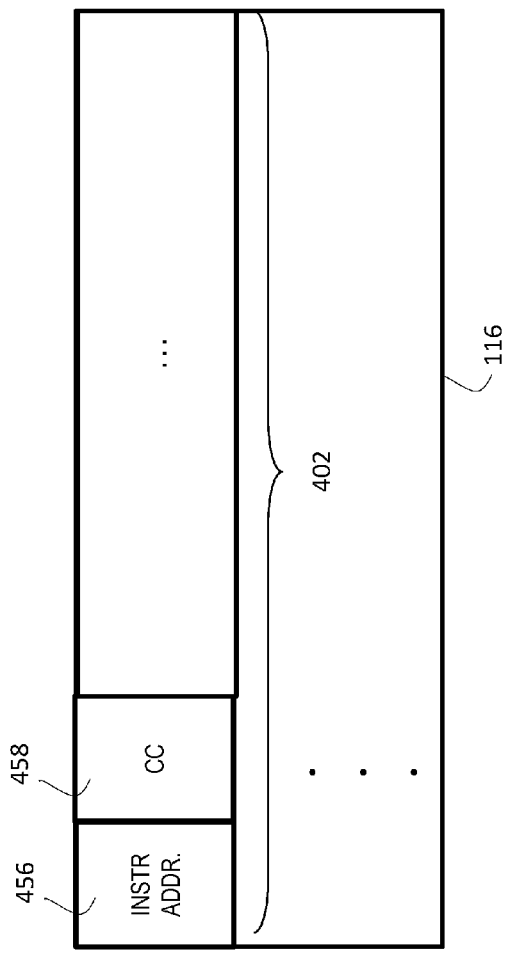
FIGS. 4A and 4B show examples of operand store compare prediction table entries according to one embodiment of the present invention.
Figure 4B:
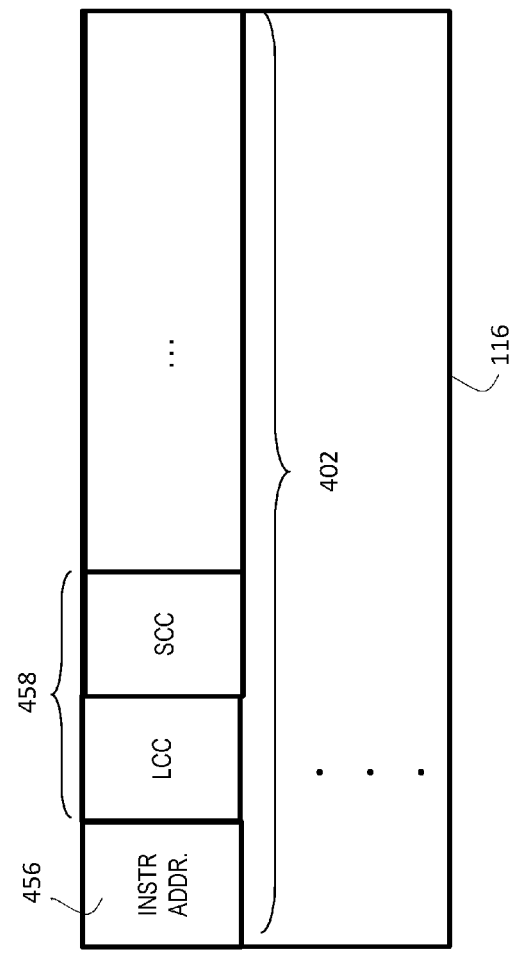

In the OSC prediction table 116, an entry 402 may be for a Load instruction or a Store instruction. That is the OSC prediction table entry 402 contains similar information regardless of whether it is for a Load instruction or a Store instruction. Further, FIG. 4A illustrates the OSC prediction table entry 402 for a RISC based system and FIG. 4B illustrates the OSC prediction table entry 402 for a CISC based system. The OSC prediction table entry 402 includes an address tag 456 of the instruction and one or more confidence counters 458. For example, the entry 402 for a CISC based system includes a pair of confidence counters 458, a load confidence counter (LCC), and a store confidence counter (SCC). In another example, for the RISC based system, the entry 402 includes a single confidence counter 458. Each entry 402 within the OSC prediction table 116 is created independent of each other. In other words, a first entry in the OSC prediction table 116 does not reference and is not referenced by a second entry in the OSC prediction table 116 or any other table for that matter, and vice versa.

The address tag 456 is compared with an instruction address to determine the OSC prediction table entry matching the instruction being executed. Based on the confidence counter(s) in the entry 402 and the corresponding LDQ and/or STQ entries 226, 338, the system identifies a Likely-Perp and a Likely-Victim. A Likely-Perp is a Store instruction that was predicted as a likely-perpetrator, and a Likely-Victim is Load instruction that was predicted as likely-victim based on the OSC prediction table 116. In a CISC based system, an instruction can be both Likely-Perp and Likely-Victim.

Figure 5:
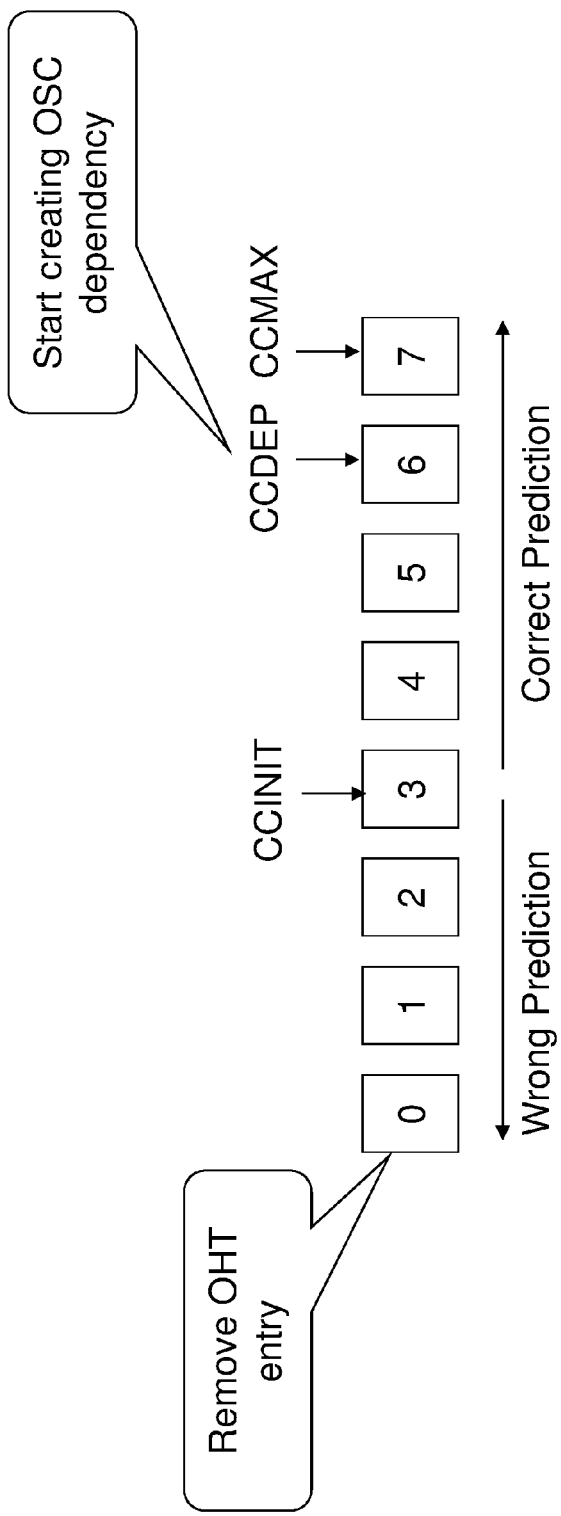
FIG. 5 shows an example confidence counter according to one embodiment of the present invention.

The one or more confidence counters 458 are instances of an N-bit Confidence counter (CC) that counts from 0 to $2n-1$. Each CC is incremented for correct prediction and decremented for wrong prediction. CCMAX indicates the max value that CC can hold. When an entry is installed into the OSC prediction table 116, the CC is initialized to a predetermined value, referred to as CCINIT. In addition, an OSC dependency is created in response to a value of the CC being equal to or greater than a predefined value, referred to as CCDEP. FIG. 5 illustrates an example 3-bit CC (N=3), with CCINT=3 and CCDEP=6. The example CC starts with a value of CC=3, and has a maximum value of 7. The CC is decremented if the prediction is correct and incremented if the prediction is wrong. Further, in the example, the system will create an OSC dependency if CC=6 or 7. Further the system will remove corresponding OSC prediction table entry if prediction is wrong and when CC=0.

When the LSU 106 detects an OSC hazard, the load-bit 208 and store-bit 308 of the OSC-Victim LDQ and OSC-Perp STQ entries that caused the OSC hazard are set. The LDQ and STQ entry 338 contains prediction information according to the CC value(s) 212, 312, to indicate if the corresponding instruction was predicted as Likely-Victim or Likely-Perp by the OSC prediction table 116.

Figure 6:
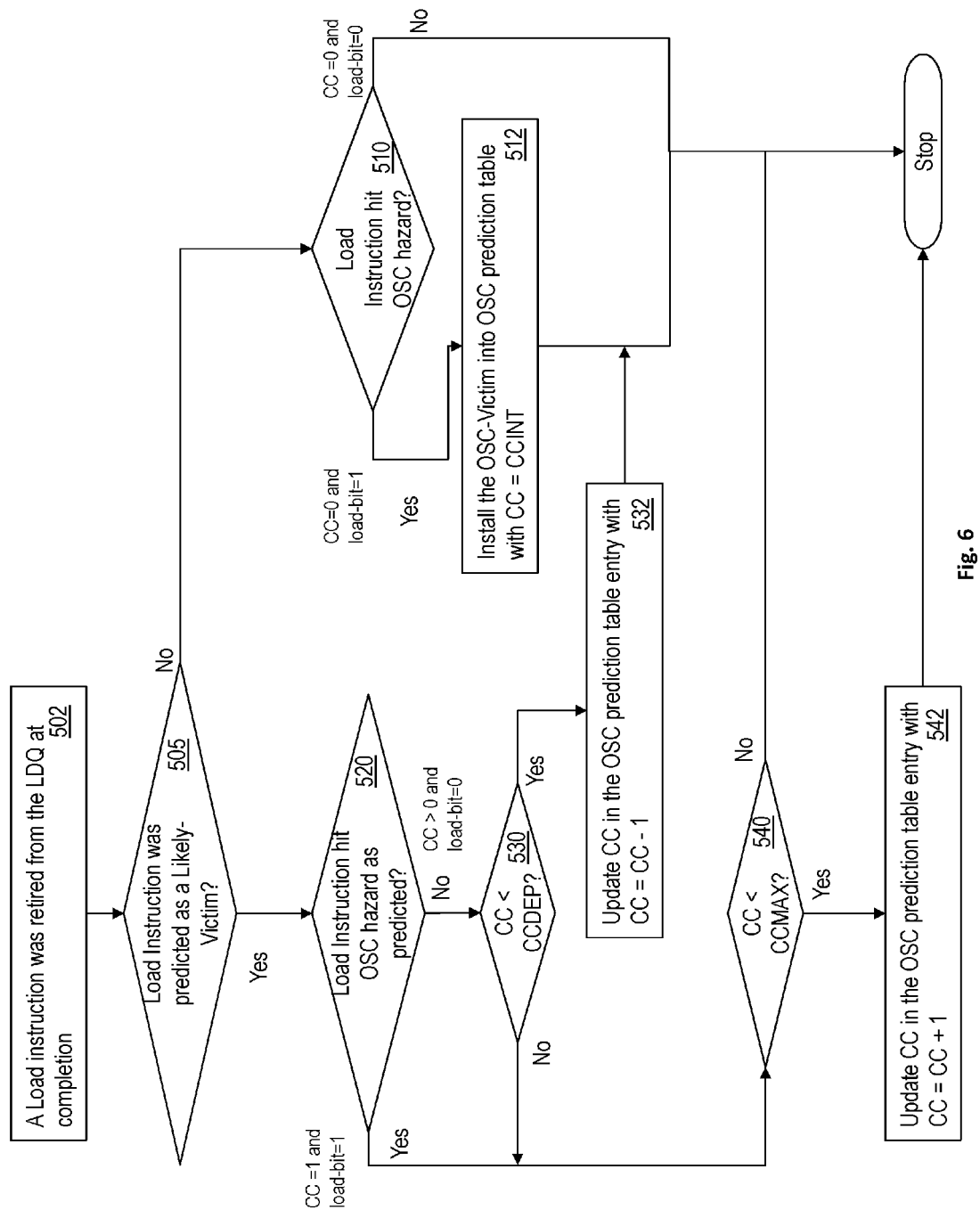
FIGS. 6-7 are operational flow diagrams illustrating examples of creating and/or updating an entry in an operand store compare prediction table according to various embodiments of the present invention.

FIG. 6 illustrates example logic to add or edit an entry in the OSC prediction table 116 in a RISC architecture with separate load and store instructions. For example, the logic is implemented when the LDQ 226 entry is retired from the LDQ 120 at completion. For example, upon completion of a Load instruction, the LDQ 120 retires the LDQ entry 226 corresponding to the Load instruction and the LDQ entry is sent to IFU 102, as shown at block 502. The IFU 102 determines if the Load instruction was predicted to be a Likely-Victim based on the CC value of the retired LDQ entry, as shown at block 505.

If the Load instruction was not predicted as a Likely-Victim, it is further determined if the Load instruction hit the predicted OSC hazard, as shown at block 510. For example, if CC=0 and load-bit=0, the Load instruction was not predicted as Likely-Victim and did not hit OSC hazard as expected, and nothing is updated in OSC prediction table in response. If CC=0 but load-bit=1, it indicates that the Load instruction was not predicted as Likely-Victim but hit an OSC hazard. In response, the Load OSC prediction table entry 402 is installed into the OSC prediction table 116, indicating the Load instruction as an OSC-Victim, as shown at block 512. The CC 458 is set to CCINT.

Alternatively, if the Load instruction was predicted to be a Likely-Victim, it is further determined if the Load instruction hit the predicted OSC hazard, as shown at block 520. If the Load instruction was predicted as Likely-Victim but did not hit an OSC hazard, the CC value is checked to determine how the OSC prediction table entry 402 is to be updated, as shown at block 530. If CC<CCDEP, update CC 458 in the OSC prediction table entry 402 with CC=old CC−1 as shown at block 532, where old CC means the CC value of the retired LDQ entry. The OSC prediction table entry 402 corresponding to the Load instruction is identified based on the index 210 that is stored in the retired LDQ entry 226 of the Load instruction. If CC becomes zero, it means that the OSC prediction table entry 402 is invalidated. If old CC>=CCDEP, update CC 458 in the OSC prediction table entry 402 with CC=old CC+1, if old CC<CCMAX as shown at block 542.

Further yet, if the Load instruction was predicted as Likely-Victim and hit an OSC hazard as expected (CC=1 and load-bit=1), the CC 458 in the OSC prediction table entry 402 is updated as CC=old CC+1, if old CC<CCMAX as shown at block 542.

Figure 7:
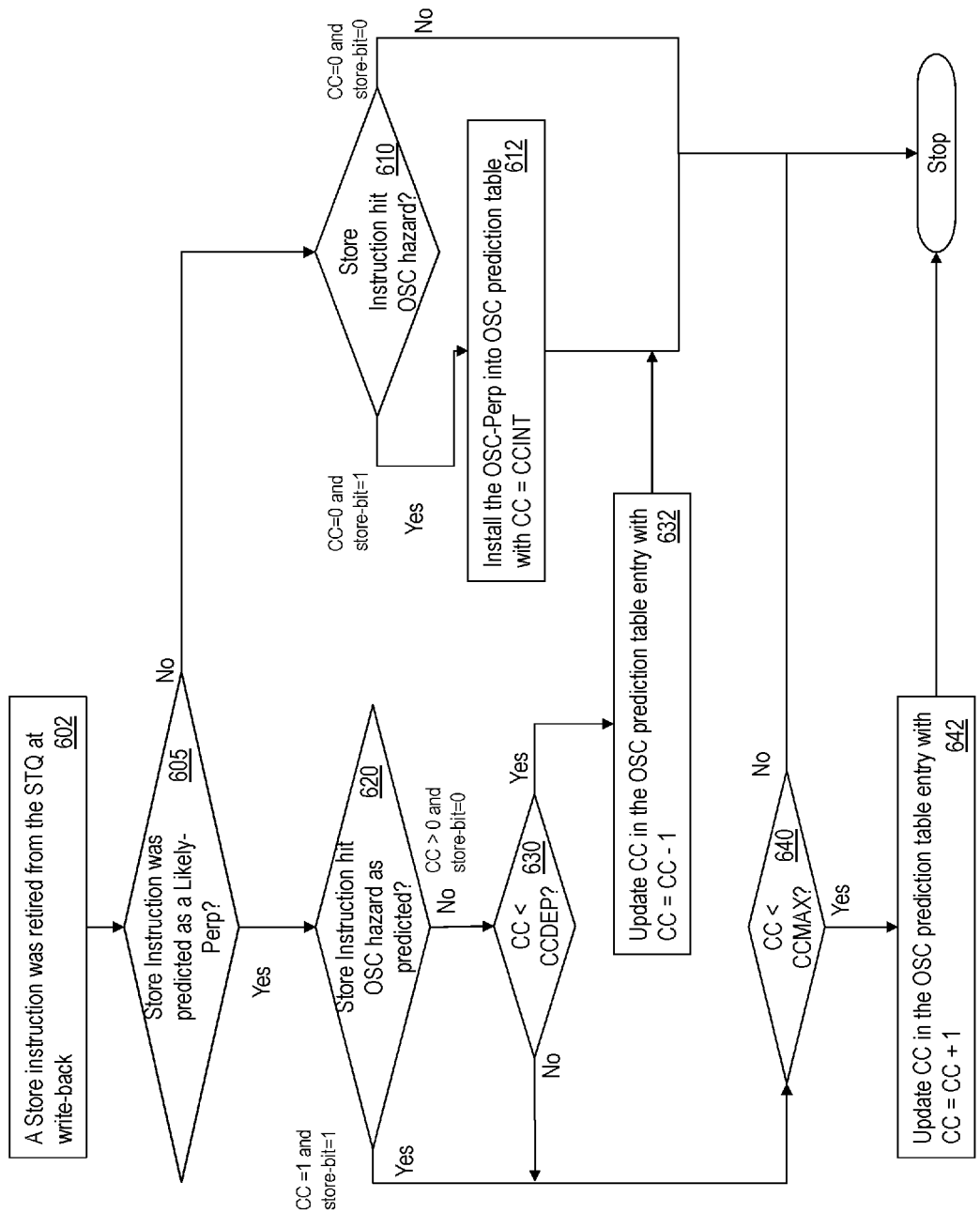

FIG. 7 illustrates example logic to add or edit an entry in the OSC prediction table 116 in a RISC architecture with separate load and store instructions. For example, the logic is implemented when the STQ entry 338 is retired from the STQ 122 at write-back. For example, upon completion of a Store instruction, the STQ 122 may retire the STQ entry 338 corresponding to the Store instruction and the retired STQ entry is sent to IFU, as shown at block 602. The IFU determines if the Store instruction was predicted to be a Likely-Perp based on the CC value of the retired STQ entry, as shown at block 605.

If the Store instruction was not predicted as a Likely-Perp, it is further determined if the Store instruction hit the predicted OSC hazard, as shown at block 610. For example, if CC=0 and store-bit=0, the Store instruction was not predicted as Likely-Perp and did not hit OSC hazard as expected, and nothing is updated in response. If old-CC=0 but store-bit=1, it indicates that the Store instruction was not predicted as Likely-Perp but hit an OSC hazard. In response, the Store OSC prediction table entry 402 is installed into the OSC prediction table 116 with CC=CCINT, indicating the Store instruction as an OSC-Perp, as shown at block 612. The CC 458 is set to CCINT.

Alternatively, if the Store instruction was predicted to be a Likely-Perp, it is further determined if the Store instruction hit the predicted OSC hazard, as shown at block 620. If the Store instruction was predicted as Likely-Perp but did not hit an OSC hazard, the CC value of retired STQ entry is checked to determine how the OSC prediction table entry 402 is to be updated, as shown at block 630. If CC<CCDEP, update CC 458 in the OSC prediction table entry 402 with CC=old CC−1, as shown at block 632, where old CC means the CC value of the retired STQ entry. The OSC prediction table entry 402 corresponding to the Store instruction is identified based on the index 210 that is stored in the retired STQ entry 338 of the Store instruction. If CC becomes zero, it means that the OSC prediction table entry 402 is invalidated. Further, if old CC>=CCDEP, the CC 458 in the OSC prediction table entry is updated as CC=old CC+1, if old CC<CCMAX as shown at block 642.

Further yet, if the Store instruction was predicted as Likely-Perp and hit an OSC hazard as expected (CC=1 and store-bit=1), the CC 458 in the OSC prediction table entry 402 is updated as CC=old CC+1, if CC<CCMAX as shown at block 642.

Figure 8:
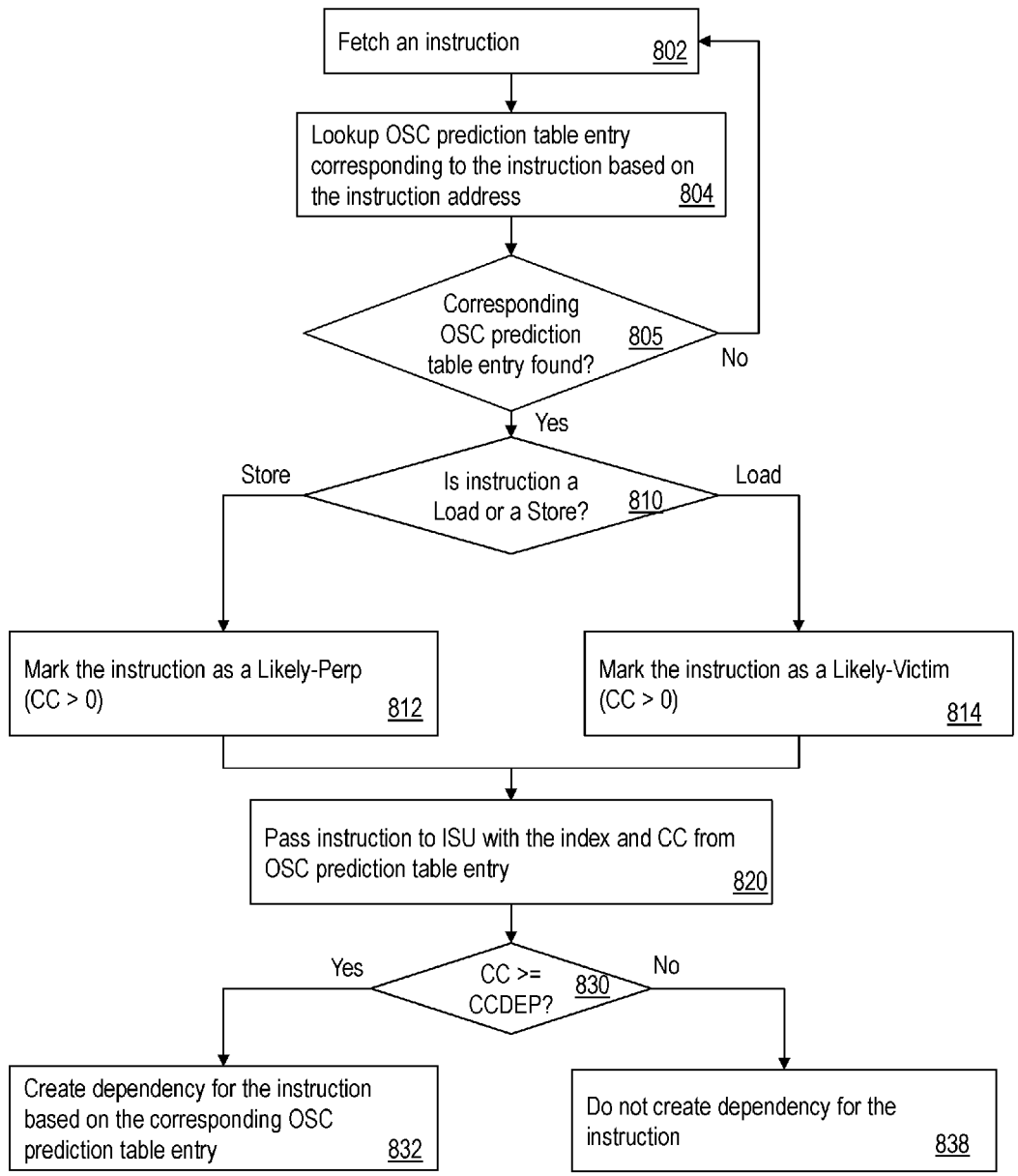
FIG. 8 is an operational flow diagram illustrating example logic of creating operand store compare dependencies for an instruction according to one embodiment of the present invention.

Referring to FIG. 8, the IFU 102 fetches an instruction and looks up a corresponding OSC prediction table entry, as shown at blocks 802 and 804. For example, when the IFU 102 fetches the instruction, the corresponding OSC prediction table entry 402 is looked up using the instruction address in the address tag 404 or 412. If the entry exists, depending on whether the instruction is a Load or a Store instruction, the Load/Store instruction is marked as Likely-Victim or Likely-Perp, as shown at blocks 810, 812, and 814. For example, if the instruction is a Store instruction with the corresponding OSC prediction table entry 402, it means the instruction was an OSC-Perp in the past and marked as a Likely-Perp with non-zero CC value. Alternatively, if the instruction is a Load instruction with the corresponding OSC prediction table entry 402, it means is the instruction was an OSC-Victim in the past and marked as a Likely-Victim with a non-zero CC value. Subsequently, the Likely-Perp or the Likely-Victim are passed down to the ISU 106 with the corresponding OSC prediction information (index and CC value) of the corresponding OSC prediction table entry when corresponding instruction is dispatched, as shown at block 820. The OSC prediction information are also saved in the LDQ 120 or the STQ 122 when the instruction is allocated to the LDQ or STQ. The ISU 106 checks the CC 458 of the corresponding instruction, to determine if OSC dependencies are to be created, as shown at block 830. For example, the ISU 106 ignores the OSC prediction marking (CC value) if CC<CCDEP, and does not create OSC dependency in this case, as shown at block 838. Alternatively, if the OSC predictions have CC>=CCDEP, the ISU 106 creates the OSC dependencies, as shown at block 832.

The above embodiment may be used in systems that have separate Load and Store instructions, that is, in RISC based systems that do not have instructions that are both Load and Store instructions. For CISC based architecture having instructions that are both loads and stores, the OSC prediction table 116 employs the two separate confidence counters, an n-bit Store confidence counter (SCC) and an m-bit Load confidence counter (LCC), as described illustrated by the FIG. 4B. In the CISC case, the SCC/LCC 458 are incremented/decremented based on the resolution of the OSC prediction for the store/load. If both SCC and LCC are zeros, the corresponding OSC prediction table entry is invalid. The counter widths for the SCC and the LCC 458 may be distinct from each other, in an example.

Similar to the RISC architecture with separate Load and Store instructions, in the embodiment with the CISC architecture, if the LSU 106 detects an OSC hazard, the load bit 208 and store bit 308 in the LDQ entry 226 of the OSC-Victim and the STQ entry 338 of the OSC-Perp are set. The LDQ entry 226 and STQ entry 338 also have OSC prediction information that includes the index/setid of the corresponding OSC prediction table entry, and, SCC and LCC values from the OSC prediction table 116. If both SCC and LCC values in LDQ/STQ entries are zero, it means that the corresponding instruction was not found from OSC prediction table and does not have OSC prediction information.

Figure 9:
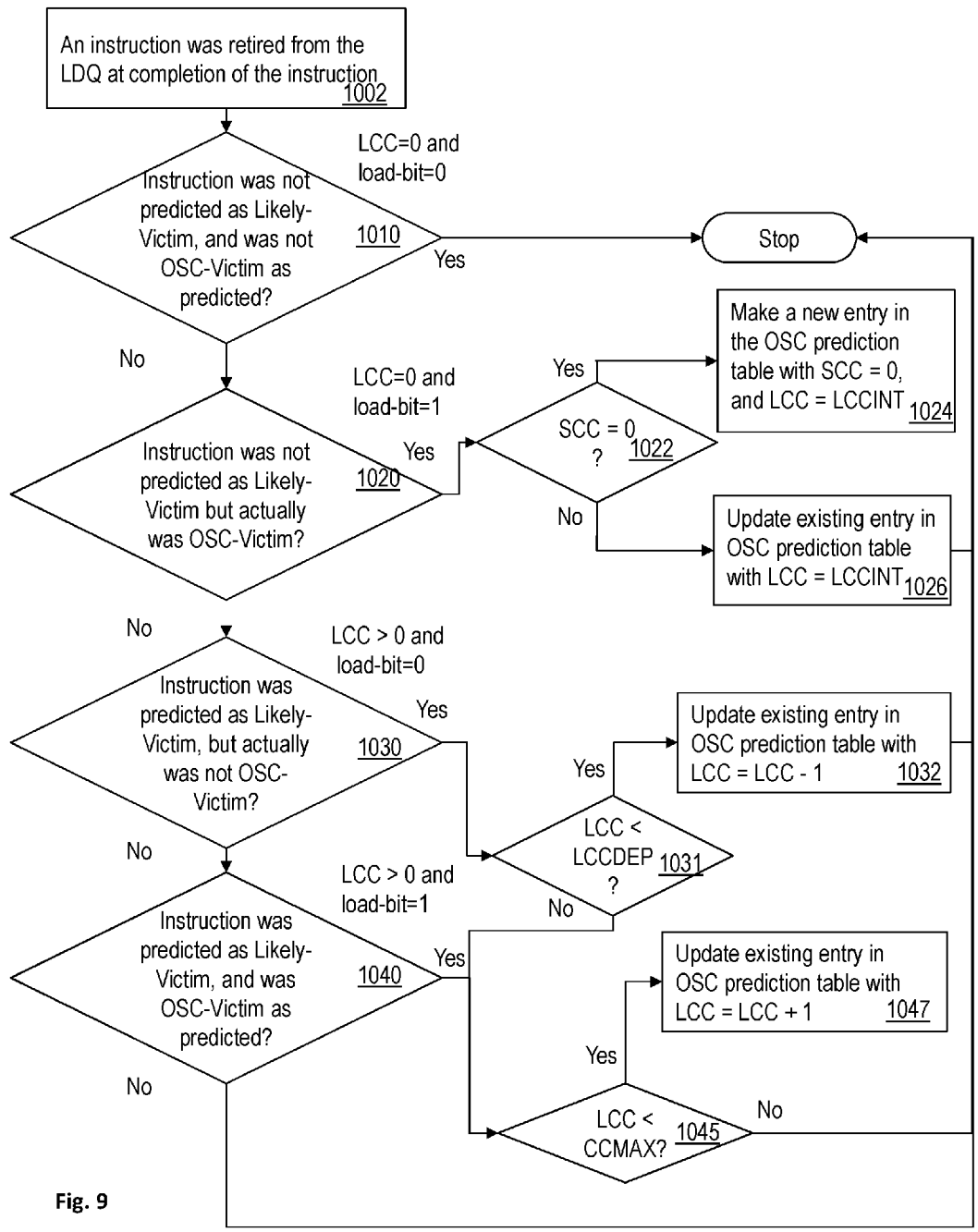
FIG. 9-10 are operational flow diagrams illustrating examples of creating and/or updating an entry in an operand store compare prediction table according to various embodiments of the present invention.

FIG. 9 illustrates example logic to add or update the OSC prediction table entry 402 in the CISC architecture that supports instructions that can have both Load and Store components. In particular, FIG. 9 illustrates example logic of operations in such architecture when an LDQ entry 226 is retired from the LDQ 120 at completion of the Load instruction, as shown at block 1002. The retired LDQ entry is sent to IFU 102 and the IFU identifies if the instruction was an OSC-Victim, and if it was predicted as a Likely-Victim or as a Likely-Perp to determine how to update the OSC prediction table 116. If the instruction was not predicted as a Likely-Victim, and subsequently was not an OSC-Victim as expected, the system doesn't change the OSC prediction table 116 in response, as shown at block 1010. The IFU 102 may determine such a condition if LCC=0, and load-bit=0 of the retired LDQ entry. Alternatively, the IFU 102 determines if the instruction was not predicted as a Likely-Victim but was actually an OSC-Victim, as shown at blocks 1020. The IFU 106 detects such a condition based on LCC=0 and load-bit=1 of the retired LDQ entry. In this case, the OSC prediction table is updated based on the SCC value of the retired entry. If the SCC value is zero, the OSC prediction table 116 is appended a new OSC prediction table entry for the OSC-Victim with SCC=0 and LCC=CCINT, as shown at blocks 1020, 1022, and 1024. Else, if the SCC value is non-zero, indicating that a corresponding OSC prediction table entry 402 exists, the LCC in the existing entry 402 is set so that LCC=LCCINT, as shown at block 1026.

Alternatively, if the instruction was actually not an OSC-Victim, although the instruction was predicted to be a Likely-Victim, the IFU 102 looks up the corresponding OSC prediction table entry 402 and updates the LCC based on the old LCC value 212 in the retired LDQ entry 226. Such a condition is detected based on LCC>0 and load-bit=0. In this case, if LCC<LCCDEP, the LCC in the OSC prediction table entry 402 is set so that LCC=old LCC−1 (minus 1) as shown at block 1031 and 1032; else, if LCC>=LCCDEP and LCC<LCCMAX, the LCC is updated so that LCC=old LCC+1 as shown at block 1045 and 1047. If the LCC value changes to 0 (zero) during this operation, and if the SCC in the OSC prediction table entry 402 already is 0 (zero), the OSC prediction table entry 402 is invalidated. The OSC prediction table entry 402 is identified based on the index of the LDQ entry.

Alternatively, if the instruction was predicted as Likely-Victim and was OSC-Victim as expected, the OSC prediction table entry 402 is updated based on the LCC value in the retired LDQ entry. The IFU 106 detects such a condition if LCC>0 and load-bit=1. In this case, LCC of the existing entry in the OSC prediction table is updated with LCC=old LCC+1 if LCC<CCMAX, as shown at block 1045 and 1047.

Figure 10:
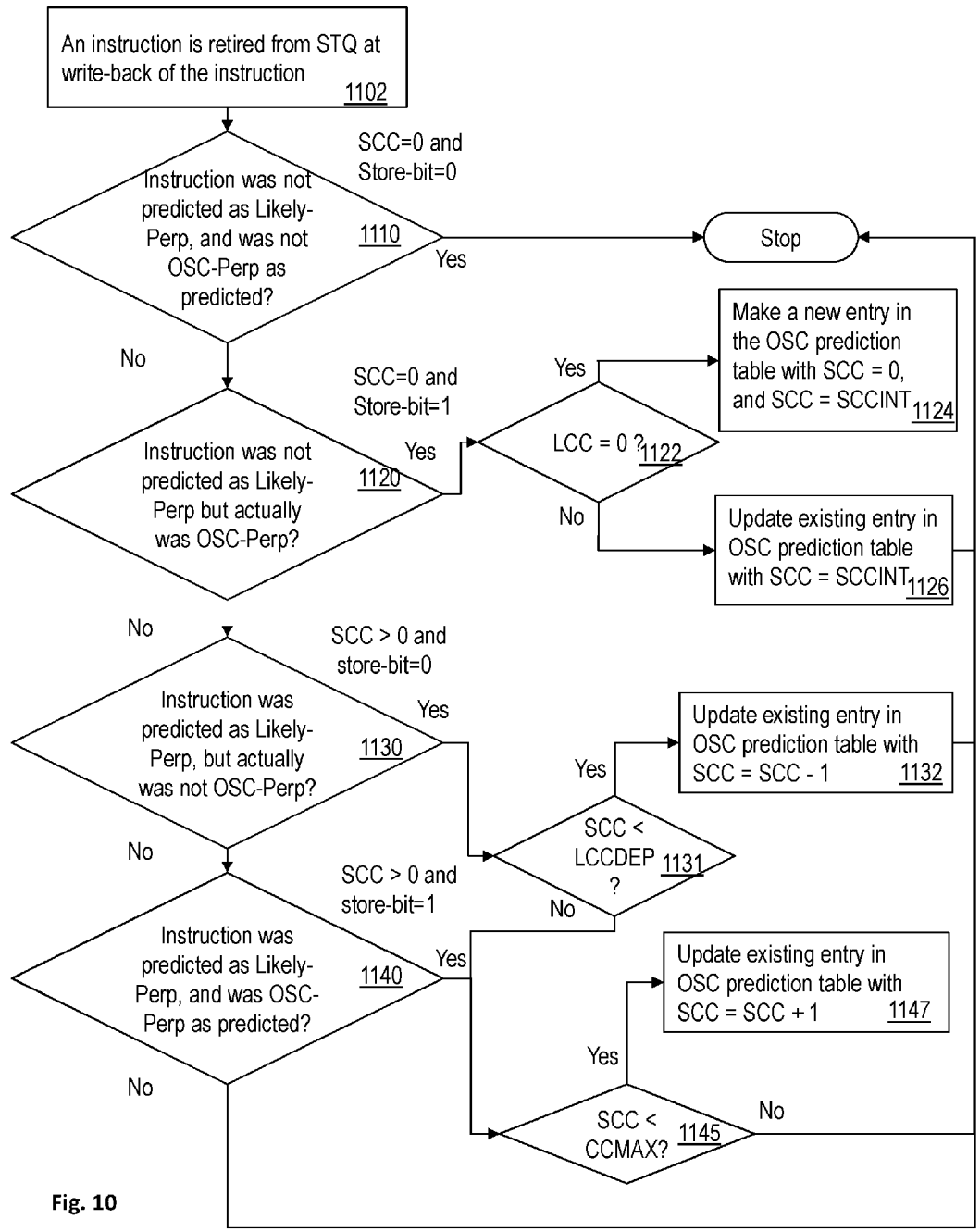

FIG. 10 illustrates example logic for a CISC architecture with combined Load and Store instructions, when the STQ entry 338 is retired from the STQ 126 at write-back of the Store instruction, as shown at 1102. The retired STQ entry is sent to IFU 102 and the IFU 102 identifies if the instruction was an OSC-Perp, and if it was predicted as a Likely-Perp to determine how to update the OSC prediction table 116. If the instruction was not predicted as a Likely-Perp, and subsequently was not an OSC-Perp as expected, the IFU 102 doesn't change the OSC prediction table 116 in response, as shown at block 1110. The IFU 102 may determine such a condition if SCC=0 and store bit=0 of the retired STQ entry 338. Alternatively, the IFU 106 determines if the instruction was actually an OSC-Perp, although the instruction was not predicted as a Likely-Perp. The IFU 102 detects such a condition based on SCC=0, and store-bit=1. In this case, the OSC prediction table 116 is updated based on the LCC value in the retired STQ entry. If LCC value is zero, the IFU makes a new OSC prediction table entry for the OSC-Perp with LCC=0 and SCC=CCINT, as shown at blocks 1120, 1122, and 1124. Else, if the LCC value is non-zero, indicating that a corresponding OSC prediction table entry 402 exists, the SCC in the existing entry 402 is set so that SCC=SCCINT, as shown at block 1126.

Alternatively, if the instruction was predicted as a Likely-Perp but was not an OSC-Perp, the IFU 102 looks up the corresponding OSC prediction table entry 402 and updates the SCC based on the old SCC value in the retired STQ entry. The IFU 102 detects such a condition if SCC>0, and store-bit=0. In this case, the SCC in the OSC prediction table is set so that SCC=old-SCC−1 (minus one) if SCC<SCCDEP, as shown at block 1131 and 1132; else, if SCC>=SCCDEP and SCC<SCCMAX, the SCC is updated so that SCC=old SCC+1 as shown at block 1145 and 1147. If the SCC becomes 0 (zero) in this transaction, and if the LCC of the OSC prediction table entry 402 is already 0 (zero), the entry 402 is invalidated.

Alternatively, if the instruction was predicted as Likely-Perp and was OSC-Perp as expected, the IFU 102 checks the SCC value to determine how to update the OSC prediction table entry 402. The IFU 102 detects such a condition if SCC>0 and store-bit=1. In this case, if old SCC<CCMAX, the IFU 106 updates the SCC with SCC=old SCC+1, as shown at block 1147.

Figure 11:
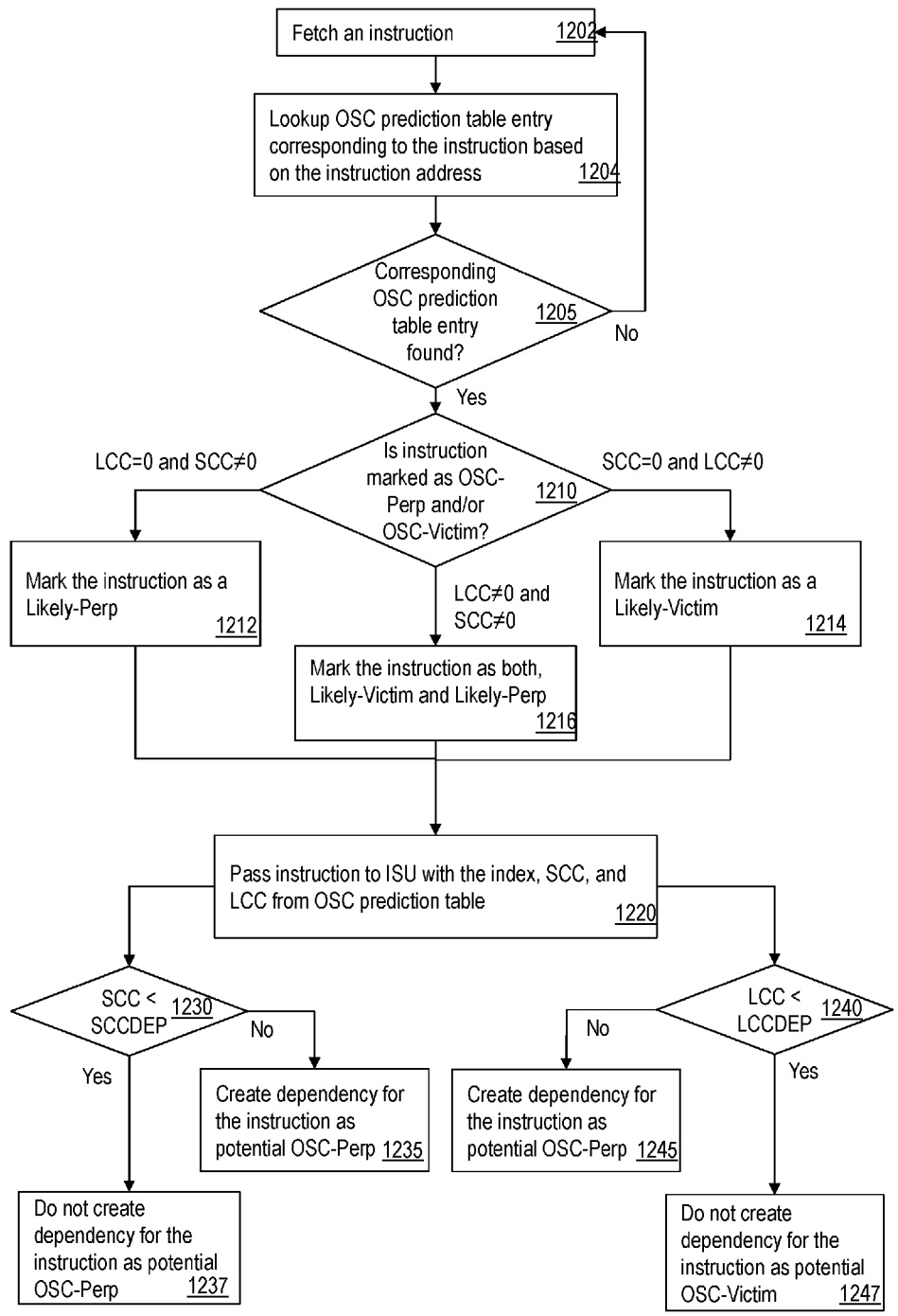
FIG. 11 is an operational flow diagram illustrating example logic of creating operand store compare dependencies for an instruction according to one embodiment of the present invention.

FIG. 11 illustrates the ISU 106 determining creation of OSC dependencies for an instruction for architectures that support combined Load and Store instructions. Referring to FIG. 11, the IFU 102 fetches an instruction and looks up a corresponding OSC prediction table entry, as shown at blocks 1202 and 1204. For example, when the IFU 102 fetches the instruction, the corresponding OSC prediction table entry 402 is looked up using the instruction address in the address tag 404. If the entry exists, depending on whether the entry is marked as an OSC-Perp (non-zero SCC), an OSC-Victim (non-zero LCC), or both, the instruction is marked as a Likely-Victim, a Likely-Perp, or both as shown at blocks 1210, 1212, 1214, and 1216. For example, the entry is identified as an OSC-Perp (non-zero SCC), the entry is marked as a Likely-Perp. Alternatively, the entry is identified as an OSC-Victim (non-zero LCC), the entry is marked as a Likely-Victim. Further yet, if both, the SCC and the LCC are non-zero, the entry is identified as both an OSC-Perp and an OSC-Victim, and is marked as both Likely-Victim and Likely-Perp accordingly. Subsequently, the instruction that is marked as at least one of a Likely-Perp and a Likely-Victim is passed down to the ISU 106 with the corresponding index, SCC, and LCC of the OSC prediction table as shown at block 1220. The ISU 106 checks the SCC and the LCC of the corresponding instruction when dispatching the instruction, to determine if OSC dependencies are to be created, as shown at block 1230 and 1240. For example, the ISU 106 ignores the Likely-Perp OSC prediction marking if SCC<SCCDEP and does not create OSC dependency as potential OSC-Perp as shown at block 1237. The ISU 106 ignores the Likely-victim OSC prediction marking if LCC<LCCDEP and does not create OSC dependency as potential OSC-Victim as shown at block 1247. Alternatively, if the OSC predictions have SCC>=LCCDEP, the ISU 106 creates the OSC dependencies as potential OSC-Perp, as shown at block 1235. If the OSC predictions have LCC>=LCCDEP, the ISU 106 creates the OSC dependencies as potential OSC-Victim, as shown at block 1245.

When LSU detects an OSC hazard, store bit in the STQ entry 338 of the OSC-Perp and the load bit in the LDQ entry 226 of the OSC-Victim are set. The STQ entry and the LDQ entry also have OSC prediction information (index, SCC, and LCC values) that was transferred from ISU to indicate if the corresponding instruction was predicted as Likely-Perp or/and Likely-Victim by the corresponding OSC prediction table entry 402. If both SCC and LCC in LDQ/STQ entry are zero, it means the corresponding instruction wasn't found from the OSC prediction table and don't have OSC prediction information.

Thus, the technical solutions described herein reduce bad OSC dependencies by creating dependencies if the OSC predictions were made with a strong confidence and by dynamically removing the instructions not causing OSC hazards anymore from the OSC prediction table. To this end, the embodiments described add one or more confidence counters to each OSC prediction table entry, which gets incremented or decremented depending on the OSC prediction and actual resolution. Accordingly, the ISU creates dependencies only for the instruction that caused the OSC hazards multiple times in the past. Further, the ISU removes an OSC prediction table entry having instructions that did not cause OSC hazards multiple times since the entry was installed into the OSC prediction table. Thus, the technical solutions facilitate an increase in prediction accuracy by predicting OSC hazards and managing the OSC prediction table adaptively and dynamically based on workload behaviors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system for dynamically managing an Operand-Store-Compare (OSC) prediction table for load and store operations executed out-of-order, the system comprising:
   a memory; and
      a processor coupled with the memory, the processor configured to:
   receive a request to retire a queue entry corresponding to an instruction;
      identify an OSC prediction for the instruction based on an OSC prediction table entry, wherein the OSC prediction indicates if the instruction is predicted to hit an OSC hazard;
      determine if the instruction hit the OSC hazard;
   in response to the OSC prediction indicating that the instruction is predicted to hit the OSC hazard and the instruction not hitting the OSC hazard, invalidate the OSC prediction table entry corresponding to the instruction;
      in response to the OSC prediction indicating the instruction to hit the OSC hazard and the instruction hitting the OSC hazard as predicted, update the OSC prediction table entry;
      in response to a confidence counter corresponding to the instruction being equal to a predetermined value, invalidate the OSC prediction table entry, wherein the confidence counter is a first confidence counter value stored in the queue entry;
      in response to the confidence counter corresponding to the instruction not being equal to the predetermined value, update the OSC prediction table entry by setting a second counter value in the OSC prediction table entry to one less than the first confidence counter value; and
      in response to the OSC prediction indicating the instruction not to hit the OSC hazard and the instruction hitting the OSC hazard, add the OSC prediction table entry corresponding to the instruction to the OSC table,
      wherein the instruction is a Load instruction and the queue entry is a Load Queue (LDQ) entry and wherein the OSC prediction and the instruction hitting the OSC hazard is determined based on the first confidence counter value and a load-bit in the LDQ entry.

* * * * *